(12) United States Patent
Acquaviva et al.

(10) Patent No.: US 7,272,730 B1
(45) Date of Patent: Sep. 18, 2007

(54) APPLICATION-DRIVEN METHOD AND APPARATUS FOR LIMITING POWER CONSUMPTION IN A PROCESSOR-CONTROLLED HARDWARE PLATFORM

(75) Inventors: Andrea Acquaviva, Rovigo (IT); Luca Benini, Ferrara (IT); Tajana S. Rosing, Sunnyvale, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 510 days.

(21) Appl. No.: 10/632,412

(22) Filed: Jul. 31, 2003

(51) Int. Cl.
*G06F 1/32* (2006.01)
(52) U.S. Cl. .................. 713/300; 713/320; 714/47
(58) Field of Classification Search ....................... None
See application file for complete search history.

(56) References Cited

U.S. PATENT DOCUMENTS

| | | | |
|---|---|---|---|
| 6,442,699 B1* | 8/2002 | Nakajima | 713/320 |
| 2004/0003303 A1* | 1/2004 | Oehler et al. | 713/300 |
| 2004/0153867 A1* | 8/2004 | McAlinden et al. | 714/47 |

OTHER PUBLICATIONS

ACPI Architecture, Takanori Watanbe; Apr. 13, 2002.*
Cristiano Pereira et al., "A Power-Aware API For Embedded and Portable Systems", Power Aware Computing (2002), pp. 155-168.
Keith I. Farkas et al., "Policies For Dynamic Clock Scheduling", OSDI (Oct. 2000, San Diego, California), pp. 43-51.
Tajana Simunic et al., "Event-Driven Power Management", IEEE Transactions on CAD (Jul. 2001), pp. 840-857.
Andrea Acquaviva et al., "LP-ECOS: An Energy Efficient RTOS", HP Laboratories Technical Report HPL-2003-81 (Apr. 17, 2003).
Tajana Simunic, "Dynamic Management of Power Consumption", Power Aware Computing (2002), pp. 102-125.
Andrea Acquaviva et al., "Software Controlled Processor Speed Setting For Low-Power Streaming Multimedia", IEEE Transactions of CAD (Nov. 2001), pp. 1283-1292.
Johan Pouweise et al., "Energy Priority Scheduling For Variable Voltage Processors", International Symposium on Low Power Electronics and Design (2001, Huntington Beach, California), pp. 28-33.

* cited by examiner

*Primary Examiner*—Thuan N. Du
*Assistant Examiner*—Fahmida Rahman

(57) ABSTRACT

An improvement in a real time operating system for supporting at least one application, a processor and at least one hardware resource. The operating system includes a power manager layer. Such power manager layer is arranged to exchange information with an application, the processor and at least one hardware resource to provide real time power management responsive to the information.

16 Claims, 4 Drawing Sheets

| POLICY | P ave (W) | % REDUCTION |
|---|---|---|
| NO POLICY | 3.25 | 0 % |
| CPU SHUTDOWN | 2.69 | 17.2 % |
| CPU & DEVICE SHUTDOWN | 1.60 | 50.7 % |
| CPU & DEVICE SHUTDOWN @191.7 MHz | 1.49 | 54.1 % |
| CPU & DEVICE SHUTDOWN @176 MHz | 1.35 | 58.4 % |

FIG. 5

| | EVENTS | POWER MGR. LAYER | DRIVER LAYER | H. ABST. LAYER |
|---|---|---|---|---|
| (S-1) | SYSTEM OFF | | | |
| (S-2) | USER ACTIVATES SYSTEM | API $_{PM/PAD,HAL}$ CALLS (SYSTEM CAPABILITIES) | API $_{PAD/PM}$ CALL (HARDWARE CAPABILITIES) | 1. TRANSITION CPU TO ACTIVE STATE 2. API $_{HAL/PM}$ CALL (CPU CAPABILITIES) |
| (S-3) | APPLICATION STARTS | | | |
| (S-4) | API CALL TO PM (APP. START) | LIST OF APPLICATIONS UPDATED | | |
| (S-5) | API CALL TO PM (COMPUTING NEEDS) | 1. RETRIEVE APPLICATION PROFILE 2. CALCULATE CPU SPEED 3. API $_{PM/HAL}$ CALL (-INFORM HAL OF SPEED) | | SET CPU SPEED |
| (S-6) | API CALL TO PM (RESOURCE NEEDED) | 1. UPDATE RESOURCE TABLE 2. API $_{PM/PAD}$ CALL (START RESOURCE (IF IDLE)) | API $_{PAD/HAL}$ CALL (START RESOURCE (IF IDLE)) | START HARDWARE RESOURCE IF NECESSARY |
| (S-7) | APPLICATION RUNNING | | | |
| (S-8) | API CALL TO PM (RESOURCE NO LONGER NEEDED) | 1. UPDATE RESOURCE TABLE 2. API $_{PM/PAD}$ (TURN RESOURCE OFF UNLESS NEEDED FOR ANOTHER APPLICATION) | API $_{PAD/HAL}$ CALL (TURN OFF RESOURCE IF NOT NEEDED) | TURN OFF HARDWARE RES. IF NOT NEEDED |
| (S-9) | API TO PM CALL (APPLICATION COMPLETE) | 1. UPDATE APPLICATION TABLE 2. RE-CALCULATE CPU SPEED 3. API $_{PM/HAL}$ (NEW CPU SPEED) | | RE-SET CPU SPEED |
| (S-10) | ALL APPLICATIONS COMPLETE (API TO PM CALLS) | API $_{PM/PAD, HAL}$ CALLS (TRANSACTION ALL HARDWARE TO SLEEP) | API $_{PAD/HAL}$ CALL (TRANSITION HARDWARE RESOURCES TO SLEEP) | TRANSITION ALL HARDWARE RESOURCES AND CPU TO SLEEP |
| (S-11) | SYSTEM OFF | | | |

APPLICATION-DRIVEN METHOD AND APPARATUS FOR LIMITING POWER CONSUMPTION IN A PROCESSOR-CONTROLLED HARDWARE PLATFORM

BACKGROUND

1. Field of the Invention

The present invention relates to an application-driven method and apparatus for limiting the energy consumption associated with the operation of a processor-controlled hardware platform. More specifically, this invention pertains to an operating system having an architecture in which energy consumption is limited through the interaction of appropriately-configured system layers linked by application-program interface ("API") calls.

2. Description of the Prior Art

Battery-operated portable systems, especially those intended for commercial applications such as palmtop computers and PDA's, typically require low cost coupled with fast time to market. Such systems impose tight constraints on energy consumption. Battery capacity has improved slowly (a factor of 2 to 4 over the past 30 years) compared to the drastic increase in computational demands over this same period of time.

Typical portable appliances include a microprocessor-based computer architecture that, coupled with embedded operating systems, simplifies application development. The energy efficiency of such systems can typically be improved by design that is aware of not only performance, but also energy consumption of both hardware and software coupled with intelligent utilization of system components at runtime.

The operation system ("OS") is situated to play a major role in the coordination of system power management for processor-based systems such as palmtop computers and PDA's. "Power Management Policy" refers to a set of actions taken by the OS to configure the processor and peripherals for the purpose of reducing system power consumption. Typical actions of an OS in this regard include (1) tuning processor voltage and frequency (2) switching among the different power states available to both the processor and other system devices.

While a few scheduling and resource allocation algorithms aimed at reducing the system power consumption have been attempted in operating systems running on hardware platforms, such techniques have heavily relied upon mathematical modeling techniques of a predictive nature to generate power management policies that employ timed turn-offs and the like. Such techniques are often statistically-based and blind to real time variations that can result in drastically ineffective operational power management policies.

SUMMARY OF THE INVENTION

The present invention addresses the preceding and other shortcomings of the prior art by providing, in a first aspect, an improvement to a real time operating system for supporting at least one application, a processor and at least one hardware resource. Such improvement comprises a power manager layer arranged to exchange information with at least one application, the processor and at least one hardware resource to provide real time power management responsive to such information.

In a second aspect, the invention provides a real time power management system for a processor-driven hardware platform for supporting at least one application. Such hardware platform has at least one hardware resource. The processor and the hardware resource are each characterized by a plurality of power states.

An operating system is provided for controlling the processor and at least one hardware resource. The operating system includes a power manager layer arranged to select at least one power state in response to a real time input from at least one application.

In a third aspect, the invention provides a method for controlling power consumption in a hardware platform responsive to information from at least one application. Such hardware platform includes a processor having a plurality of power states and includes at least one hardware resource characterized by a plurality of power states.

The method of the invention includes the step of organizing the operating system into a kernel, a driver layer, a hardware abstraction layer, and a power manager layer. At least one real time input is applied from an application to the power manager layer. A power management policy is determined in the power manager layer in response to the real time input. The power management policy is communicated from the power manager layer to the processor and at least one hardware resource.

The preceding and other features of the invention will become further apparent from the detailed description that follows. Such description is accompanied by a set of drawing figures. Numerals of the drawings, corresponding to those of the written description, point to the features of the invention with like numerals referring to like features throughout both the written description and the drawing figures.

BRIEF DESCRIPTION OF THE DRAWINGS

FIG. 5 is a chart illustrating the operation of an integrated power management system for a processor-controlled hardware platform in accordance with an embodiment of the invention.

DETAILED DESCRIPTION OF THE PREFERRED EMBODIMENT

Figures 1, 6:
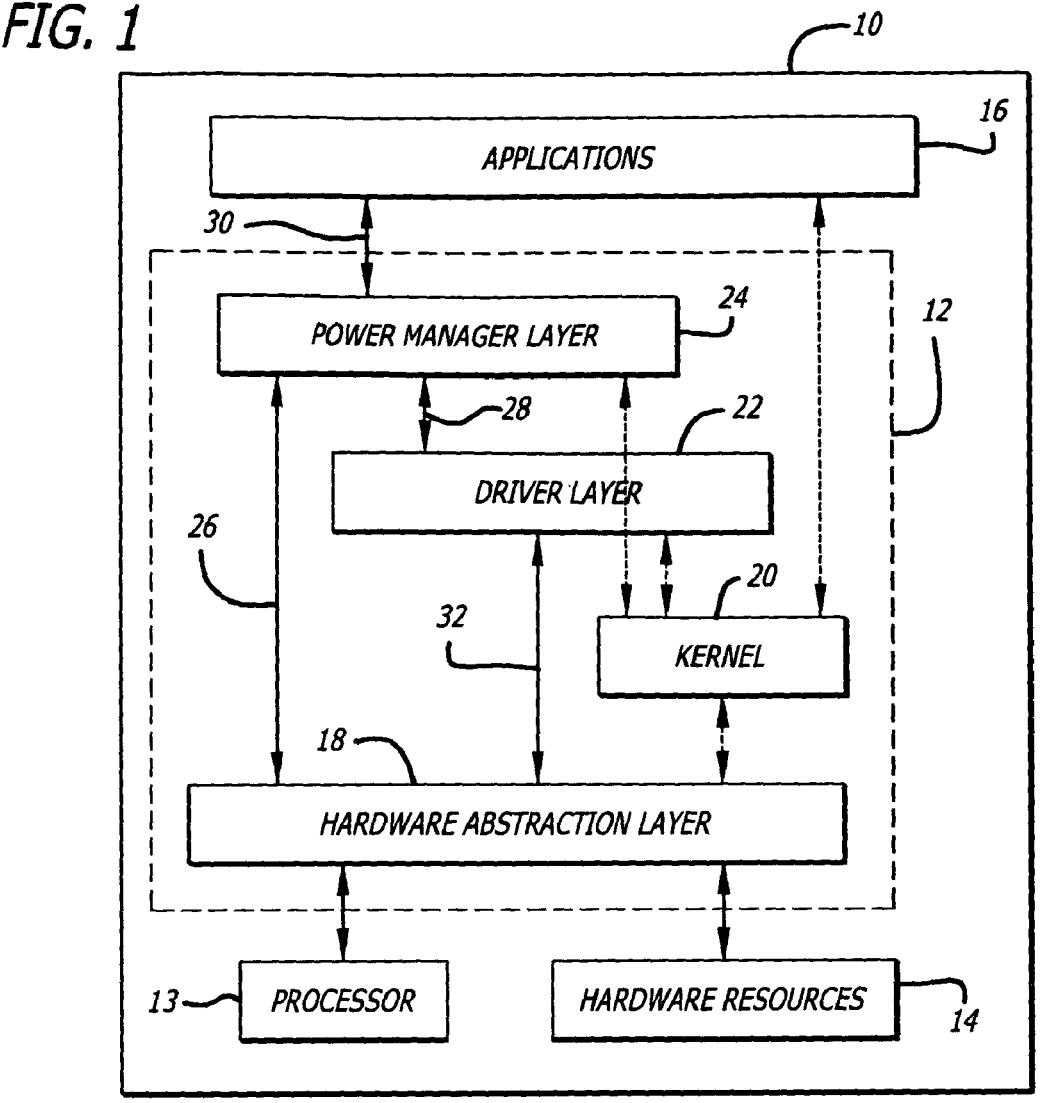
FIG. 1 is a diagram of the architecture of a system incorporating an operating system in accordance with an embodiment of the invention.
FIG. 6 is a table of experimental results for illustrating the relative energy savings available to an integrated power management system in accordance with an embodiment of the invention.

FIG. 1 is a block diagram of a processor-controlled hardware platform 10 in accordance with an embodiment of the invention. The platform 10 may comprise a PDA or other battery-operated, possibly hand-held device. It is typical of such devices that control of power consumption is critical.

The platform 10 includes an operating system whose architecture is illustrated within shadow outline 12 in FIG. 1. A processor 13 and hardware resources 14 are capable of performing actions that a user may activate, either directly or indirectly, from time to time. The actions of the processor 13 and the hardware resources 14 are responsive to one or more applications 16. In the invention, the operating system 12 is arranged to respond to the state and the needs of the applications 16. Such information is communicated by application-program interface (API) calls made to and between the applications and layers of the operating system 12.

Referring to the architecture of the operating system 12, it is seen to include four layers that span from hardware to application space. These include, in order, a hardware abstraction layer 18, a kernel 20, a driver layer 22 and power manager layer 24. The hardware abstraction layer 18 defines architecture and platform specific modules. The kernel 20 consists of schedulers, support for thread synchronization, exception handling, interrupt handling and timers. The driver layer 22 defines the mechanisms for accessing the hardware resources 14.

The processor 13 and at least one hardware resource 14 are of power-aware configurations. That is, each is capable of functioning at a plurality of power states, at least one of such power states being active (operational) and at least one being low power. The power manager layer 24 is arranged to make real time decisions concerning the power states of the processor 13 and the hardware resources 14. The former decisions are implemented through API calls to the hardware abstraction layer 18 while the latter are implemented through API calls to the driver layer 22 followed by driver layer 22-to-hardware abstraction layer 18 calls. Such decisions are based upon real time information obtained from the applications 16.

Paths of communication of information within the architecture of the operating system 12 are indicated in FIG. 1. As the kernel 20 and its functions are conventional and not relevant to the power management functions of the invention, paths of communication between it and the other elements of the operating system 12 are indicated by dashed lines. Solid lines 26, 28, 30 and 32 indicate communication, via API calls, between the power manager 24 and the hardware abstraction layer 18, the power manager layer 24 and the driver layer 22, the applications 16 and the power manager layer 24 and the hardware abstraction layer 18 and the driver layer 22. Each of the applications 16, the hardware abstraction layer 18, the driver layer 22 and the power manager layer 24 is configured to send, receive and act upon an appropriate API call.

Figure 2:
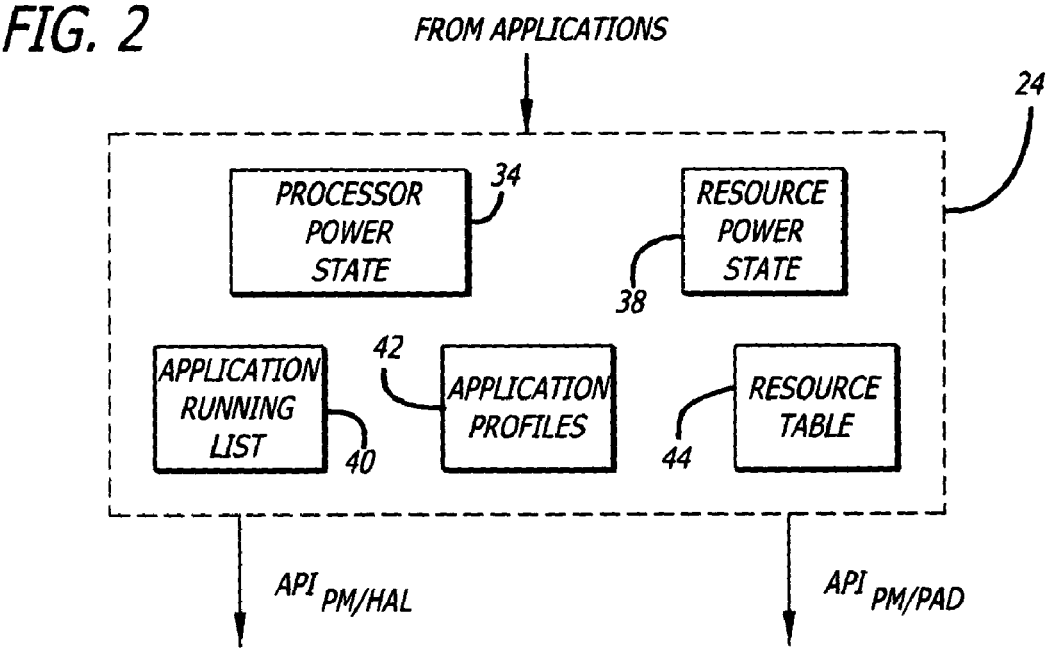
FIG. 2 is a block diagram of a power manager layer of an operating system in accordance with an embodiment of the invention.

The present invention integrates the power manager layer 24 into the operating system 12. FIG. 2 is a functional diagram of the power manager layer 24. It includes a number of operational modes including processor power state selection 34 and hardware resource power state selection 38. Ancillary devices are associated with the various modes of the power manager 24. Processor power state selection 34 relies upon an application running list 40 and an application profiles database 42 while hardware resource power state selection 38 relies upon a resource table 44. The application running list 40, as the name implies, informs the power manager layer 24 of which, if any, applications are currently running on the platform 10. It will be seen below that such knowledge is essential to determining when the power-aware elements of the system are to be returned to low power states. The application profiles database 42 receives and stores the relationship between processor utilization and processor clock frequency for a particular application(s). The resource table 44 comprises a list of the hardware resources in use at any given time.

The power manager layer 24 receives the status and operational requirements of each application capable of running on the platform 10 and determines the appropriate power-saving adjustments to the system hardware in response. Such adjustments include processor and hardware power state selections. By centralizing such decisions in the power manager layer 24 of the operating system 12 that will be seen to be responsive in real time to the application(s) of the hardware platform 10, one is able to implement an integrated power management policy that will be seen, below, to yield significant energy savings and, accordingly, greatly enhance the utility of a hand-held battery-operated device.

The power management decisions made within the power manager layer 24 are caused to be implemented through instructions provided to dedicated configuration controls located within the hardware abstraction layer 18 and power-aware driver layer 22. API calls to the power aware driver layer 22 ($API_{PM/PAD}$) transmit power management decisions that pertain to the states of hardware resources. Such calls result in subsequent calls ($API_{PAD/HAL}$) advising the hardware abstraction layer 18 of actions (resource power state) to be taken with regard to the relevant hardware resources. It will be seen that the system of API calls and power management policy responsive to application needs and status permits usage of low power hardware resource states without incurring a resource start-up penalty.

Power management policy pertaining to the operation of the processor 13 (processor mode selection) is transmitted directly to the hardware abstraction layer 18 for implementation by means of $API_{PM/HAL}$ calls. The hardware abstraction layer 18 is of the "low power" or "power-aware" type insofar as it is configured to provide the commands required to cause the processor 13 and the hardware resources 14 to switch from power state to power state upon receipt of appropriate API calls from the power manager layer 24 and from the driver layer 22 respectively.

Figure 3:
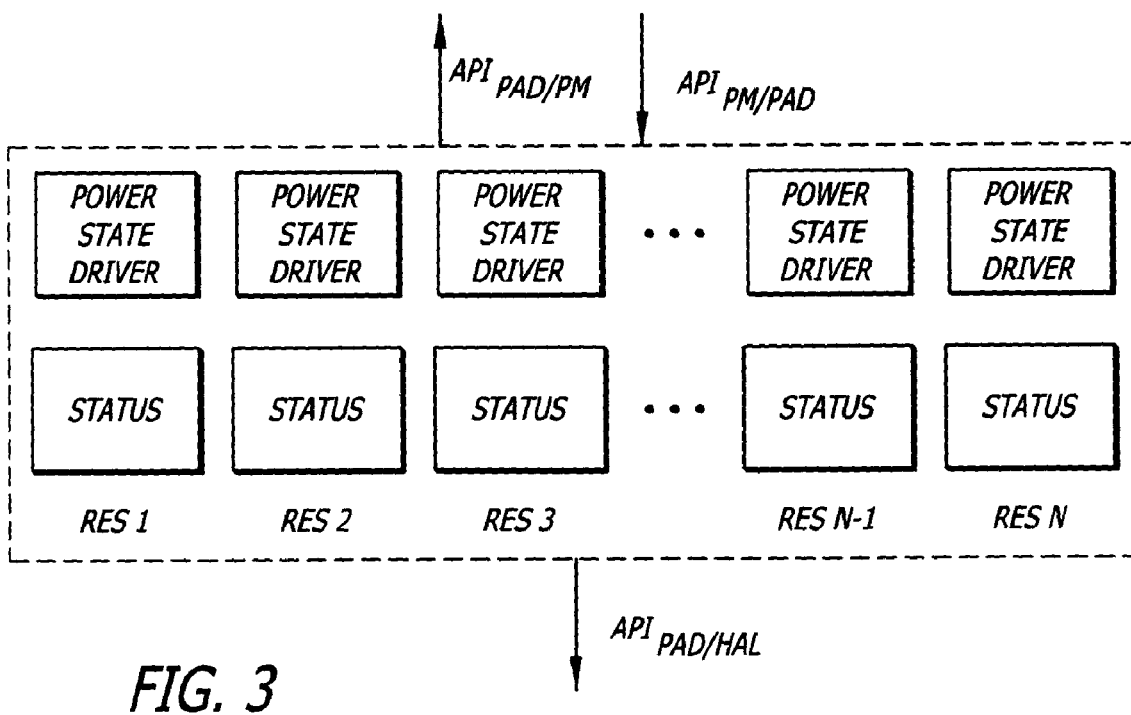
FIG. 3 is a block diagram of a power-aware driver layer of an operating system in accordance with an embodiment of the invention.

FIG. 3 is a block diagram of the driver layer 22 of the operating system 12. The driver layer 22 receives calls ($API_{PM/PAD}$) from the power manager layer 24 transmitting power management policy decisions pertaining to changes in the power states of hardware resources 14. The status of hardware resources 14 are confirmed and reported to the power manager layer 24 by means of $API_{PAD/PM}$ calls. Resource power state instructions are transmitted to the hardware abstraction layer 18 for execution by means of $API_{PAD/HAL}$ calls. As in the case of the hardware abstraction layer 18, the driver layer 22 is configured for power-aware in that it is able to process an API call received from the power manager layer 24 containing a real time power management policy decision to change the power state of a hardware resource 14 and to transmit an appropriate API call to the low power hardware abstraction layer 18 to cause such layer to generate a command in response that will cause the power state of the hardware resource 14 to be changed accordingly.

Figure 4:
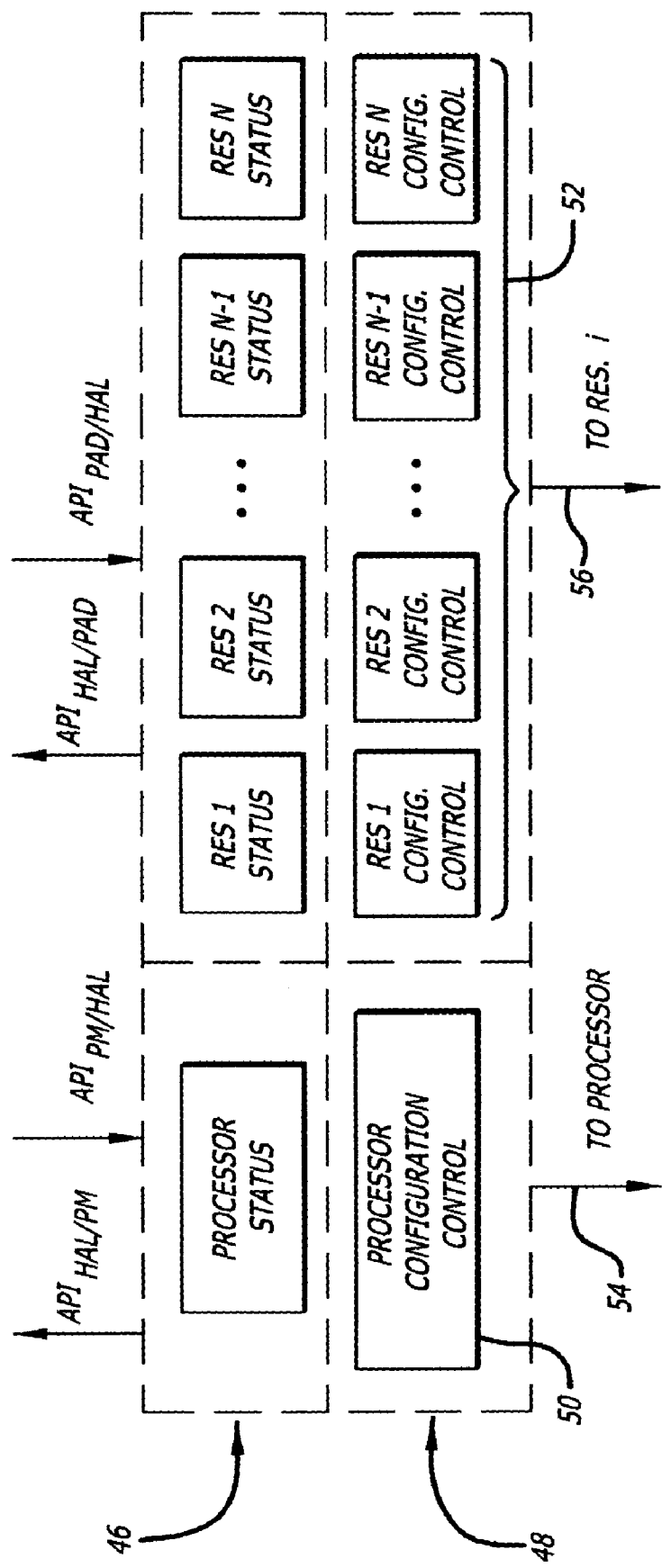
FIG. 4 is a block diagram of a hardware abstraction layer of an operating system in accordance with an embodiment of the invention.

FIG. 4 is a block diagram of the hardware abstraction layer 18 of the operating system 12. The hardware abstraction layer 18 may be thought of as comprising both a software side 46 and a hardware side 48. On the software side 46, the layer 18 is arranged to receive calls reflecting power management policy relating both to the processor 13 and to the hardware resources 14. On the hardware side 48, a processor configuration control 50 and a plurality of resource configuration controls 52 are provided for generating hardware commands in the form of electrical signals, transmitted via conductors 54 and 56 respectively, that result in execution of the power management policy directed by the power manager layer 24.

The software side 46 of the low-power hardware abstraction layer 18 receives, as inputs, calls $API_{PM/HAL}$ that contain processor power state directions from the power manager layer 24 and confirms processor status to the power manager 24 by means of calls $API_{HAL/PM}$. Directions pertaining to the operation of the hardware resources 14 of the platform 10 are received from the driver layer 22 by $API_{PAD/HAL}$ calls while the states of hardware resources 14, are reported back to the driver layer 22 by means of $API_{HAL/PAD}$ calls.

As can be seen, API calls communicate information among the layers of the operating system 12. It will be shown below that such calls also provide a communication link between the applications 16 and the operating system 12 that enables application-driven power management of the processor-driven hardware platform 10.

A format for embedded API calls for affecting the communication employed in an operating system 12 in accordance with the invention is as follows:

A. Communication between Application and Power Manager Layer (API Calls Embedded in Application)

i) pm_application_start(app_handle, app_name): (Application 16 informing power manager layer 24 that it is starting);

ii) pm_application_end(app_handle, app_name): (Application 16 informing power manager layer 24 that it has ended);

iii) pm_res_alloc(app_handle, res_handle): (After application has begun, power manager layer is notified that application requires a hardware resource 14);

iv) pm_res_dealloc(app_handle, res_handle): (Application no longer requires the particular hardware resource 14); and v) pm_app_profile(app_handle): (Application informs the power manager layer of its power and performance characteristics).

B. Communication between Power Manager Layer and Driver Layer ($API_{PM/PAD}$)

i) pm_res_init(res_data): (Power manager layer tells driver layer to turn on and initialize a hardware resource 14);

ii) pm_res_power_state_set (res_data): (Power manager layer sets the power state of the hardware resource 14 (e.g., active, sleep, off); and iii) pm_res_power_state_read (res_data): Power manager layer reads the current power state of hardware resource 14.

C. Communication between Power Manager Layer and Hardware Abstraction Layer ($API_{PM/HAL}$)

i) pm_change_speed(new_speed): (Power manager layer tells hardware abstraction layer to adjust frequency of processor clock);

ii) pm_init(data): (Power manager layer tells hardware abstraction layer to transition processor 13 to active power state); and iii) pm_power_state_set(data): (Power manager layer tells hardware abstraction layer to transition processor 13 to a specific power state).

D. Communication between Driver Layer and Hardware Abstraction Layer i) pm_power_state_set: (Driver layer informs hardware abstraction layer to set a hardware resource 14 power state);

ii) pm_power_state_get: (Driver layer 22 asks hardware abstraction layer 18 about power state of a hardware resource 14).

FIG. 5 is a chart illustrating the operation of an integrated power management system for a processor-controlled hardware platform in accordance with an embodiment of the invention. The sequence of operations has been broken into eleven steps S-1 through S-11 corresponding to rows of the chart. Columns indicate (from left) events initiated outside the operating system 12, including real time API calls from an application to the power manager layer 24, actions of and API calls from the power manager layer 24, actions of API calls from the driver layer 22 and actions of the hardware abstraction layer 18 respectively. Communications between applications and the power manager layer 24 are indicated by "API to Power Manager Call" while communications within the layers of the operating system 12 are indicated by API call notation as described with reference to the preceding figures. The substantive content of each API call is indicated in parentheses beneath each (underlined) call.

Referring to steps S-1 through S-11 whereby power management is accomplished in accordance with an embodiment of the invention, the entire system of the hardware platform is in an idle power state at step S-1. The multiple power states of power-aware devices, including processors and hardware resources, may be divided into two classes. The first class of power states is denoted "active" or "operational". Such class of power states of a processor or hardware resource is characterized by two factors. The first of such factors is the power consumption of the device and the other factor is its processing speed.

The second class of power states of a power-aware processor or hardware resource is denoted "low power". Examples of varieties of low power states include, for example "sleep", "doze" and "off". The low power states of power-aware processors and hardware devices are characterized by another set of factors, namely, (1) power consumption (as before) and (2) time delay required for reentry into an active or operational state. Such power-aware characteristics of the processor and the hardware resources are transmitted to the power manager layer 24 from the hardware abstraction layer 18 whereby they are taken into account by the power manager layer 24 in formulating a real time power management policy as described below.

A user takes some action triggering an electrical or mechanical signal that is recognized by the hardware platform. This activates the system at step S-2, causing the processor 13 to transition to an active state and generating in API calls from the driver layer 22 and the hardware abstraction layer 18 that inform the power manager layer 24 of the power-aware characteristics of the available processor 13 and hardware resources 14. Thus, after step S-2, the power manager layer 24 possesses the necessary information for taking the power-aware characteristics of the various devices into account in making subsequent power management decisions.

The application, activated by the user at step S-2, begins to run at step S-3. The application informs the power manager layer that it has begun by an API call at step S-4 and, in response, the power manager layer 24 updates the application running list 40 accordingly.

At step S-5, an API call is sent from the application to the power manager layer 24 informing it in real time of a computing need that has arisen. This might be dictated, for example, by the requirement of an MP3 decorder application to receive data from a WAVELAN card at a sufficiently high rate to deliver a real time audio output to the user through the speakers of the hardware platform. When such a call is received at the power manager layer 24, a decision concerning the appropriate speed of the processor 13 is made with reference to the application profile that indicates the relevant tradeoff of application data rate and processor speed stored in the application profiles 42. The processor speed is then transmitted at step S-5 by API call to the hardware abstraction layer 18 and the speed of the processor 13 set by an appropriate corresponding command from the hardware abstraction layer 18 to the processor 13.

The application may then inform the power manager layer 24 of a hardware resource need required for application execution at step S-6. Such hardware resource need is communicated by API call embedded in the application to the power manager layer 24 resulting in a call from the power manager layer 24 to the driver layer 22. This causes an API call to be made from the driver layer 22 to the hardware abstraction layer 18 that results in the generation of appropriate commands for activating the desired hardware resource 14 (assuming that such hardware resource 14 is at a low power state at the time and has not already been activated for use by another application). The transition of the desired hardware resource from a low power state to an active state is reported to the power manager layer 24 through API calls originating with the hardware abstraction layer 18 and, in response, the power manager layer 24 causes the resource table 44 to be updated accordingly. Such transition may occur concurrently with the initialization sequence of the application whereby a user would be unable to perceive any delay in transitioning the hardware resource to an active state. The application is running with the appropriate hardware resource engaged at step S-7.

The application then notifies the power manager layer 24 that the hardware resource 14 is no longer needed by API call at step S-8. This results in (1) the power manager layer 24 notifying the driver layer 22 to initiate turn off of such hardware resource 14 unless it is currently required for another application and, assuming that it is not required for another application at this time ad (2) the driver layer 22 notifying the hardware abstraction layer 18 by API call to return the hardware resource 14 to a low power state. Once the hardware abstraction layer 18 has generated the appropriate commands to return the hardware resource 14 to a low power state, this information is relayed through API calls to the power manager layer 24 where the resource table 44 is correspondingly updated.

At step S-9, the application notifies the power manager layer 24 by API call that the application is complete. The power manager layer 24 denotes this in the application running list 40 and re-calculates processor 13 speed based upon the deletion of the performance requirement occasioned by the (former) active or operational state of such application. The re-calculated processor 13 speed is transmitted to the hardware abstraction layer 18 by API call where corresponding commands are generated for resetting the speed of the processor 13.

At step S-10, the power manager layer 24, upon receiving notification from the last of the applications indicated by the application running list 40 to have been running that such application is now complete, makes an API call to the hardware abstraction layer 18 telling the layer 18 to transition the processor 13 to a low power state and, should the resource table 44 indicate that any hardware resource is active, notifies by driver layer 22 by API call to transition such hardware resource(s) to low power state. The hardware platform thereby returns to low power state at step S-11.

As can be seen from the above-described process, power-saving decisions are made at the power manager layer 24. The power management policy is set in this single layer of the operating system 12. Each power management decision is made by the power manager layer 24 upon receipt and consideration of an action pertaining to an application. Thus, power management policy is application and event driven in the present invention in contrast to systems that rely in whole or in part upon timed turn-offs and the like based upon resources and processor modeling rather than input from applications. Finally, it can be seen that the power aware driver layer 22 is arranged and capable of providing power-aware directions to appropriately-configured hardware resources 14 and the hardware abstraction layer 18 is capable of causing power-aware instructions to be executed by the processor 13.

Power saving features of the invention that are evident from a review of FIG. 5 include (1) the ability to "call up" a hardware resource only when needed rather than initialize it when the system is turned on, (2) ability to mask the delay of transitioning a hardware resource to an active state by starting the transition during the initialization sequence of the application, (3) continual recalculation of processor speed in accordance with the needs of currently-running applications, and (4) transitioning of both hardware resources 14 and the processor 13 to low power states as soon as possible without the expenditure of idling energy.

Experimental results confirm the power savings that may be realized in a processor-controlled hardware platform configured and operating in accordance with the invention. FIG. 6 is a table of experimental results for illustrating the relative energy savings available to an integrated power management system. The data presented in the figure are based upon the implementation of the invention on a PDA hardware platform that is commercially available from the Hewlett-Packard Company of Palo Alto, Calif. under the SMART BADGE IV trademark. The hardware resources of the processor-controlled SMART BADGE IV platform comprise (in addition to a processor), a wireless local area network card (WAVELAN), memory and speakers while an MP3 audio decoder application is run on the platform. The MP3 audio decoder application receives frames through a wireless link, decodes them and plays the resultant audio out on the speakers. The WAVELAN power-aware driver generates $API_{PAD/HAL}$ calls for causing the wireless link and processor frequency/voltage to be controlled in response to the power management policy. Power was measured by monitoring the current absorption of the platform.

Comparisons in the table of FIG. 6 are made for four different cases:
i) NO POLICY: Application runs at full speed with hardware resources always "ON";
ii) CPU SHUT-DOWN: Application employs only processor shut-down (hardware resources shut-down not available);
iii) CPU & DEVICES SHUT-DOWN: Both processor and hardware resource shut-down utilized; and
iv) CPU & DEVICES SHUT-DOWN AND CLOCK SCALING: Processor clock scaling, processor shut-down and hardware resource shut-down available.

The processor clock scaling (case "iv") policy utilized within the power manager layer 24 of the experimental system calculates processor clock frequency in accordance with the header of each MP3 frame. The details of such policy are disclosed in an article of A. Acquaviva, L. Benini and B. Ricco, "Software Controlled Processor Speed Setting for Low-Power Streaming Multimedia", *IEEE Transactions* of CAD (November 2001) at pages 1283 through 1292. Of course, the invention is not limited to such policy. Rather numerous other power-aware policies may be adopted for regulating the adjustable frequency of the processor clock. The choice of an appropriate power-aware policy for regulating processor clock frequency may rely upon a number of factors including application, hardware resource and processor characteristics.

The operation of the above-described hardware platform is as follows. The processor transitions into running state as soon as the MP3 decoder application begins execution. MP3 application informs the power manager of its resource needs through an API call. The power manager responds by making $API_{PM/PAD}$ calls to the power-aware WAVELAN device drivers. Next, the application informs the processor of its processing needs via $API_{PAD/HAL}$ call. The power manager layer responds by making an $API_{PM/HAL}$ call to set processor frequency and voltage appropriately. When a hardware resource is no longer needed, the power manager layer is informed by the MP3 decoder via an API call and responds, via an $API_{PM/PAD}$ call followed by an $API_{PAD/HAL}$ call, to cause such hardware resource to be turned OFF (i.e. transitioned to a lower power state). When the MP3 decoder has completed the decoding process, it informs the power manager layer by API call. The power manager layer first initiates shutoff of all hardware resources through $API_{PM/PAD}$ calls. This is followed by an $API_{PM/HAL}$ call to initiate the processor shut-down sequence.

Referring to the table of FIG. 6, it is seen that the combination of processor clock scaling, device and processor shut-down more than double system power efficiency. About 50.7 percent of power savings occur when only processor and device shut-down are utilized. In addition to saving power, a performance improvement was noted resulting from the fact that the CPU does not process useless broadcast packets coming from the network since the WAVELAN card is shut down as soon as the incoming frame buffer is full.

Additional 8 percent savings is obtained by employing processor clock scaling. The magnitude of the savings is limited, first, by the computationally-intensive nature of the MP3 decoder which limits the ability to reduce processor clock speed. Secondly, as only clock frequency scaling was available on the SMART BADGE IV hardware platform employed, the potentially much greater power reductions available, through known power management policies, when scaling down processor voltage at the same time that processor clock frequency is slowed down, could not be utilized in the power management policy of the power manager layer. Similar results have been obtained on a hardware platform in accordance with the invention employing multi-tasking.

Thus it is seen that the present invention provides both apparatus and a method for limiting power consumption in a processor-controlled hardware platform. By utilizing the teachings of the invention, one may realize substantial reductions in power consumption. Such conversation of power is especially critical in the case of hand-held, battery-powered devices.

While this invention has been disclosed with reference to its presently-preferred embodiment, it is not limited thereto. Rather, the invention is limited only insofar as it is described by the following set of drawing figures and includes within its scope all equivalents thereof.

What is claimed is:

1. A system comprising:
   a hardware platform having a processor and at least one hardware resource, wherein the hardware platform is a hand-held, battery-operated device;
   a real time operating system supporting a plurality of software applications running on the hardware platform;
   a power manager layer having an application profiles database which stores an application profile for each of the plurality of software applications running on the hardware platform, wherein each application profile describes a first relationship between a processor utilization and a processor clock frequency for the software application and a second relationship between an application data rate and a processor speed for the software application, said power manager layer being arranged to
      receive real time input from at least one of the plurality of software applications, wherein the real time input includes the at least one of the plurality of software applications informing the power manager layer, through an application programming interface (API) call embedded in the at least one of the plurality of software applications, of a determination made by the at least one of the plurality of software applications of a change in a current processor or hardware resource requirement of the at least one of the plurality of software applications,
      determine a power management adjustment using the received real time input and the first and second relationships stored in the application profile of the at least one of the plurality of software applications; and
      exchange information with at least one of said processor and said at least one hardware resource, wherein said information includes the determined power management adjustment, to implement real time power management responsive to the real time input, wherein the real time power management includes changing the power state of at least one of said processor and said at least one hardware resource in response to the change in the current processor or hardware resource requirement of the at least one of the plurality of software applications.

2. The system as defined in claim 1 wherein said API call includes at least one of:
   a) a notification that the at least one of the plurality of software applications has been initiated; and
   b) a notification that the at least one of the plurality of software applications has ended.

3. The system as defined in claim 2 wherein said API call includes the resource requirements for the at least one of the plurality of software applications, the resource requirements including at least one of:
   a) a notification that said at least one of the plurality of software applications requires at least one hardware resource; and
   b) a notification that said at least one of the plurality of software applications no longer requires said at least one hardware resource.

4. The system as defined in claim 1 further comprising:
   a) a hardware abstraction layer, wherein
   b) information is exchanged between said power manager layer and said hardware abstraction layer by means of application-interface calls; and c) said hardware abstraction layer is arranged to cause said processor to be actuated in accordance with said calls.

5. The system as defined in claim 4 wherein said hardware abstraction layer is further arranged to:
   a) exchange information with a driver layer by means of program-interface calls; and
   b) cause said at least one resource to be actuated in accordance with said calls.

6. The system as defined in claim 1 further comprising:
   a) a driver layer, wherein
   b) information is exchanged between said power manager layer and said driver layer by means of application-program interface calls.

7. The system as defined in claim 1 wherein said power manager layer further comprises:
   a) a processor power state selection mode; and
   b) a hardware resource power state selection mode.

8. The system as defined in claim 7 wherein said power manager layer includes a resource allocation table.

9. The system as defined in claim 1 further comprising a driver layer arranged to:
   a) receive an application-program interface call including the processor or hardware resource requirement for the at least one of the plurality of software applications, the processor or hardware resource requirement containing a power state instruction concerning a resource from said power manager layer and to generate a corresponding instruction; and
   b) transmit corresponding information to a hardware abstraction layer by the application-program interface call.

10. A real time power management system for a processor-driven hardware platform for supporting a plurality of software applications, said platform including a hand-held, battery-operated device having at least one hardware resource wherein said processor is characterized by a plurality of power states and said at least one hardware resource is characterized by a plurality of power states, said power management system comprising, in combination:
    a) an operating system for controlling said processor and said at least one hardware resource;
    b) said operating system including a power manager layer having an application profiles database which stores an application profile for each of the plurality of software applications, wherein each application profile describes a first relationship between a processor utilization and a processor clock frequency for the software application and a second relationship between an application data rate and a processor speed for the software application, said power manager layer arranged to
       receive real time input from at least one of said plurality of software applications, wherein the real time input includes the at least one of the plurality of software applications informing the power manager layer, through an application programming interface (API) call embedded in the at least one of the plurality of software applications, of a change in a current processor or hardware resource requirement of the at least one of said plurality of software applications,
       change at least one of a processor power state and a power state of said at least one hardware resource using said received real time input and the first and second relationships stored in the application profile of the at least one software application, in response to the change in the current processor or hardware resource requirement of the at least one of the plurality of software applications.

11. The real time power management system as defined in claim 10 wherein said API call of said at least one of the plurality of software applications additionally includes at least one of:
    a) a notification that said at least one of the plurality of software applications has been initiated; and
    b) a notification that said at least one of the plurality of software applications has ended.

12. The real time power management system as defined in claim 10 wherein said API call of said at least one of the plurality of software applications additionally includes at least one of
    a) a notification that said at least one of the plurality of software applications requires at least one hardware resource; and
    b) a notification that said at least one of the plurality of software applications no longer requires said at least one hardware resource.

13. A method for controlling power consumption in a hardware platform responsive to information from a plurality of software applications, wherein the hardware platform is a hand-held, battery-operated device, said platform including a processor having a plurality of power states and at least one hardware resource characterized by a plurality of power states, said method comprising the steps of:
    organizing said operating system into a kernel, a driver layer, a hardware abstraction layer, and a power manager layer;
    applying real time input from at least one of the plurality of software applications to said power manager layer, wherein real time input includes the at least one of the plurality of software applications informing the power manager layer, through an application programming interface (API) call embedded in the at least one of the plurality of software applications, of a change in a current processor or hardware resource requirement of the at least one of the plurality of software applications,
    accessing an application profile for the at least one of the plurality of software applications stored within an application profiles database which stores an application profile for each of the plurality of software applications running on the hardware platform, wherein each application profile describes a first relationship between a processor utilization and a processor clock frequency for the software application and a second relationship between an application data rate and a processor speed for the software application;
    determining a power management policy in said power manager layer using said real time input and the first and second relationships stored in the application profile for the at least one of the plurality of software applications;
    communicating said power management policy from said power manager layer to said processor or said at least one hardware resource; and
    changing the power state of at least one of said processor and said at least one hardware resource in response to the change in the current processor or hardware resource requirement of the at least one of the plurality of software applications.

14. The method as defined in claim 13 wherein the step of determining a power management policy additionally comprises the step of determining a processor power state.

15. The method as defined in claim 13 wherein the step of determining a power management policy additionally comprises the step of determining a power state of said at least one hardware resource.

16. The method as defined in claim 13 wherein the step of communicating said power management policy from said power manager layer to said processor and said at least one hardware resource additionally includes the steps of:

embedding application-program interfaces into said power manager layer, said driver layer and said hardware abstraction layer; and communicating said power management policy by means of said call.

* * * * *

UNITED STATES PATENT AND TRADEMARK OFFICE
CERTIFICATE OF CORRECTION

PATENT NO. : 7,272,730 B1  Page 1 of 1
APPLICATION NO. : 10/632412
DATED : September 18, 2007
INVENTOR(S) : Andrea Acquaviva et al.

It is certified that error appears in the above-identified patent and that said Letters Patent is hereby corrected as shown below:

Column 1, line 36, delete "operation" and insert -- operating --, therefor.

Column 3, line 16, after "and" insert -- a --.

Column 3, line 31, delete "18" and insert -- 13 --, therefor.

Column 9, line 60, delete "conversation" and insert -- conservation --, therefor.

Signed and Sealed this

Twenty-fourth Day of November, 2009

David J. Kappos
*Director of the United States Patent and Trademark Office*